(12) United States Patent
Fields et al.

(10) Patent No.: US 6,251,287 B1
(45) Date of Patent: Jun. 26, 2001

(54) APPARATUS AND METHOD FOR TREATING LIQUIDS

(75) Inventors: William M. Fields, Evergreen; Donald L. Boyd, Arvada, both of CO (US)

(73) Assignee: Water Systems Integrators, LLC, Englewood, CO (US)

(*) Notice: Subject to any disclaimer, the term of this patent is extended or adjusted under 35 U.S.C. 154(b) by 0 days.

(21) Appl. No.: 09/552,639

(22) Filed: Apr. 19, 2000

Related U.S. Application Data

(60) Provisional application No. 60/129,997, filed on Apr. 19, 1999.

(51) Int. Cl.[7] ................................................ C02F 1/32
(52) U.S. Cl. .................. 210/748; 210/750; 210/188; 210/192; 210/198.1; 210/205; 210/218; 210/903; 422/24; 422/186.3
(58) Field of Search .................... 210/748, 750, 210/188, 192, 198.1, 205, 218, 903; 422/24, 186.3

(56) References Cited

U.S. PATENT DOCUMENTS

| | | | |
|---|---|---|---|
| 3,862,296 | * | 1/1975 | Dotson et al. . |
| 4,995,955 | | 2/1991 | Kim et al. ......................... 204/157.3 |
| 5,238,581 | | 8/1993 | Frame et al. ......................... 210/748 |
| 5,660,719 | | 8/1997 | Kurtz et al. ............................. 210/85 |
| 5,871,620 | * | 2/1999 | Haug et al. . |

* cited by examiner

Primary Examiner—David A. Simmons
Assistant Examiner—Betsey Morrison Hoey
(74) Attorney, Agent, or Firm—Duft, Graziano & Forest, P.C.

(57) ABSTRACT

A system for treating a nitrate contaminated liquid to remove deleterious or undesirable nitrates therefrom wherein a supply of ionized nitrogen is entrained into a continuous stream of a nitrate contaminated liquid and thereafter is exposed to treating apparatus which changes the nitrates in the nitrate contaminated liquid into at least ionized nitrogen which then combines with the ionized nitrogen entrained in the continuous stream of a nitrate contaminated liquid to form a separated nitrogen gas and a treated liquid.

10 Claims, 2 Drawing Sheets

APPARATUS AND METHOD FOR TREATING LIQUIDS

This application claims the benefit of U.S. Provisional Application No. 60/129,997 filed Apr. 19, 1999, which is hereby incorporated by reference for all that is disclosed therein.

FIELD OF THE INVENTION

This invention relates generally to the treatment of liquids and more particularly to the treatment of liquids to remove deleterious matter therefrom.

BACKGROUND OF THE INVENTION

There are many instances wherein it is necessary to treat a variety of liquids to remove deleterious or undesirable matter therefrom. One such instance relates to the treatment of water. In many parts of the world, there exists a need for potable water. In many locations, there are a variety of sources available for providing water but the water from such sources contains deleterious or undesirable matter therein. One such matter relates to nitrates, such as $NO^3$. While several types of apparatus and methods have been used to remove such nitrates at least to the extent to make the water potable, there still remains a need for an efficient and economical system for the removal of such nitrates from such water. In one type of apparatus used to try to remove such nitrates, the water is passed through apparatus that is designed to remove such nitrates. The apparatus comprises an outer tube having an inlet and an outlet. Inside of the tube, a plurality of ultra violet lamps are mounted in a circumferentially spaced apart relationship. The ultra violet lamps emit light at a frequency designed to break down the nitrates in the water. The water flows through the inlet and around the ultra violet lamps and out through the outlet. While the apparatus does function to break down at least a majority of the nitrates in the water, a great many of the broken down nitrates rejoin together so that deleterious or undesirable nitrates remain in the water.

BRIEF DESCRIPTION OF THE INVENTION

This invention provides apparatus and method for the treatment of contaminated water, particularly water contaminated with nitrates, so that the ionized nitrogen resulting from the treating apparatus or method are exposed to other quantities of the same ionized nitrogen to form a separate nitrogen gas that may be safely vented to the atmosphere.

In the apparatus and method for treating contaminated water containing deleterious or undesirable nitrates, the contaminated water is fed into a conventional treating apparatus which breaks down the contaminated water into ionized nitrogen ($N_1$) and other substances such as oxygen 1 or 2. Before the ionized nitrogen can revert back by combining with other available materials, it is subjected to a sufficient quantity of additional ionized nitrogen so that the ionized nitrogens particles combine to form nitrogen gas ($N_2$) which can be safely vented to the atmosphere. This is accomplished by combining the additional quantity of ionized nitrogen with the nitrate contaminated water prior to the treating apparatus so that the entire combination of the contaminated water and the additional quantity of the ionized nitrogen is subjected to the treating apparatus.

In a preferred embodiment of the invention, the apparatus for providing the additional desired quality of the ionized nitrogen to the contaminated water is a diffuser which is located to supply a stream of ionized nitrogen, preferably in a bubble formation wherein each bubble is of an average size of 1 mm. Preferably, the bubbles are spherical in shape. The diffuser is of the type marketed by Refraction Technologies Corp. under the trade designation "SOLIDOME". While a diffuser is preferred, other types of apparatus may be used to supply the additional desired quantity of the ionized nitrogen. Also, different types of apparatus may be used to convert nitrogen gas into ionized nitrogen to be fed into the diffuser. In one type of such apparatus, nitrogen gas is fed into a housing and is subjected to ultra violet lamps which emit light at 185 nanometers to change the nitrogen gas into ionized nitrogen.

In one method of using the apparatus of the invention, a quantity of nitrate contaminated water from a well is measured to determine the quantity of nitrates contained in the quantity of the water. A calculation is then made to determine the quantity of ionized nitrogen that will be freed when the quantity of water is subjected to the above-described method for breaking down the nitrate contaminated water into ionized nitrogen to determine the quantity of ionized nitrogen resulting from the treatment. The diffuser is then controlled to emit ionized nitrogen into the nitrate contaminated water so that the quantity of ionized nitrogen is at least between about 0.75 to 2.5 times as great as the quantity of ionized nitrogen freed from the nitrate contaminated water. For example, if there are 100 particles of ionized nitrogen freed from the nitrate contaminated water for a predetermined time, there would be between about 175 to 350 particles of ionized nitrogen added. The nitrate contaminated water is then fed into the apparatus of this invention wherein it is combined with the ionized nitrogen being emitted by the diffuser, each at rates discussed more fully below. The combined nitrate contaminated water and the quantity of ionized nitrogen is then exposed to the treating apparatus which preferably comprises a plurality of ultra violet lamps emitting light at a frequency of about 254 nanometers. As the ionized nitrogen is freed from the contaminated water, the additional ionized nitrogen is available to form the nitrogen gas.

BRIEF DESCRIPTION OF THE DRAWINGS

A preferred embodiment of the invention is illustrated in the accompanying drawings in which.

DETAILED DESCRIPTION OF THE INVENTION

Figure 3:
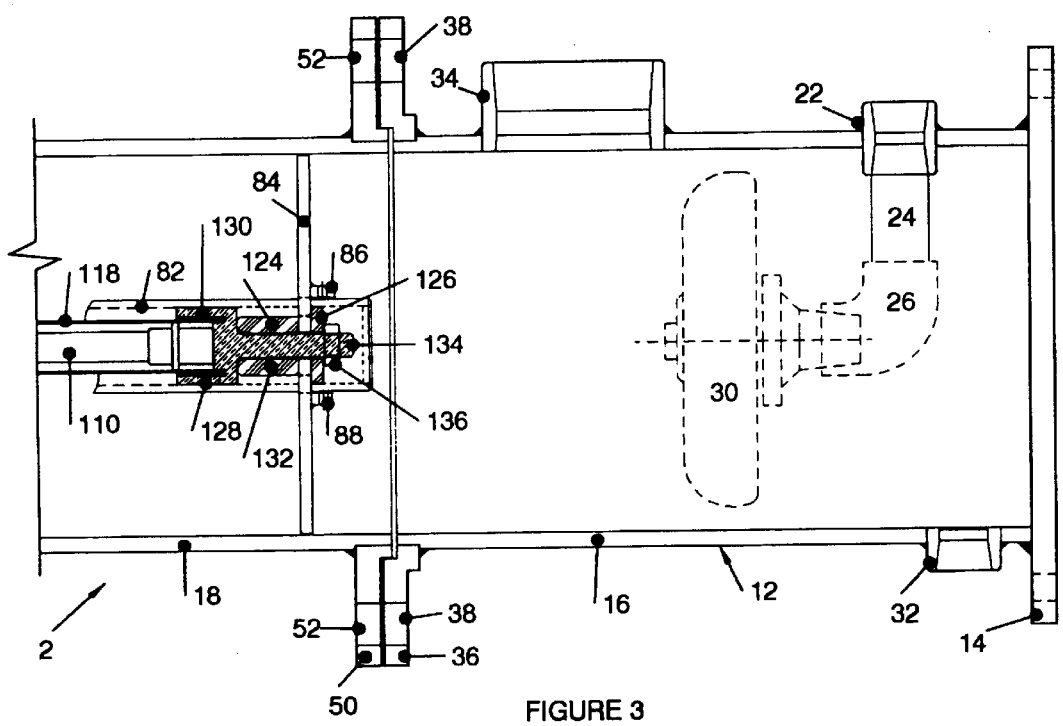
FIGS. 3 and 4 are side elevational views with parts in section of the tower of the apparatus.
Figure 4:
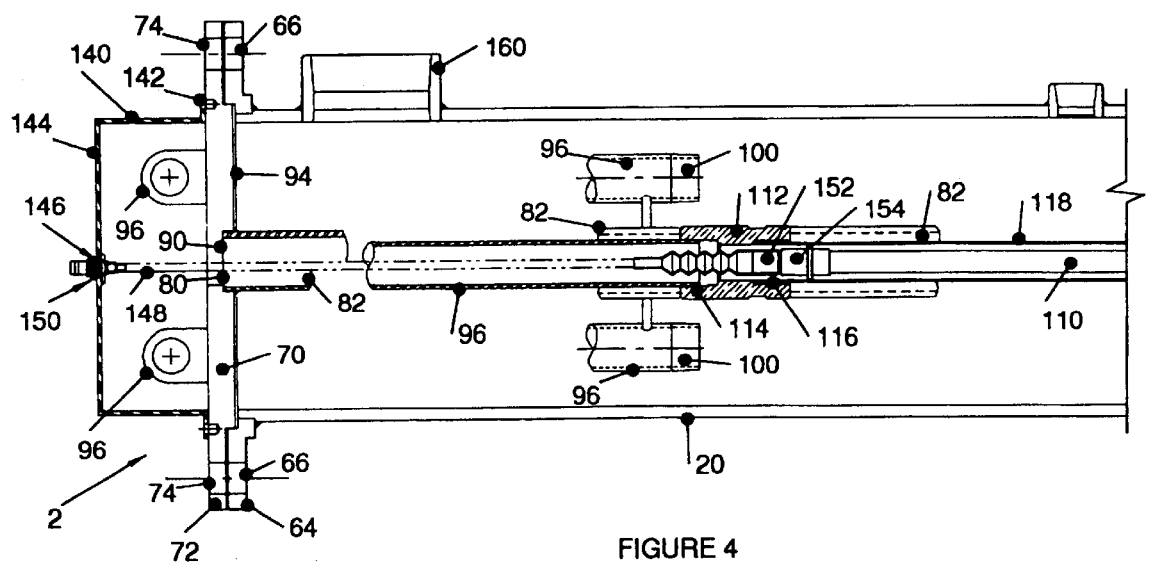
Figure 3:
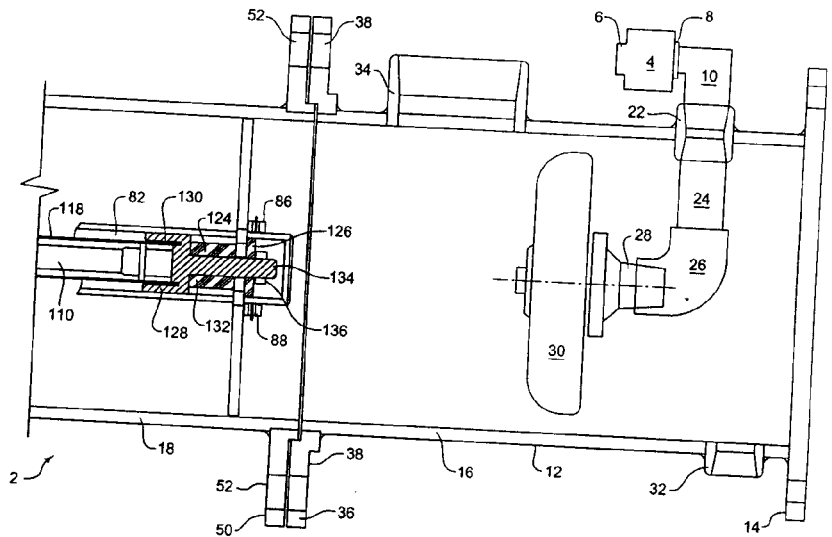
Figure 4:
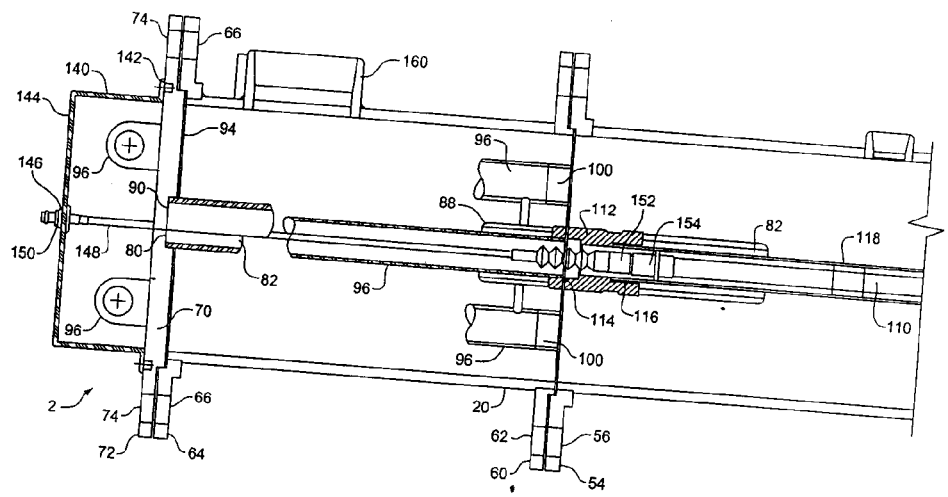

The apparatus 2 of this invention is illustrated in FIGS. 3 and 4 of the drawings. The apparatus 2 comprises a unit 4 for converting nitrogen gas ($N_2$) into ionized nitrogen ($N_1$). The nitrogen gas is introduced through inlet 6 into the unit 4. While the unit 4 may comprise a number of different types of apparatus, it preferably comprises apparatus wherein a plurality of ultra violet lamps are located in a circumferentially spaced apart relationship and wherein the ultra violet lamps emit light at a frequency of about 185 nanometers so as to convert the nitrogen gas into ionized nitrogen which passes through the outlet 8 into conduit 10.

A tower 12, preferably extending in a vertical direction and having a generally cylindrical transverse cross-sectional configuration, has a base 14 having a plurality of circumferentially spaced apart openings formed therein so that the base 14 may be secured to a support (not shown) by suitable means such as threaded bolts (not shown). The tower 14 preferable comprises a lower portion 16, a central portion 18 and an upper portion 20. In some instances, the central portion 18 and the upper portion 20 may be combined into one portion.

The lower portion 16 has a fitting 22 mounted therein for receiving in a sealed relationship one end of the conduit 10 and one end of a conduit 24. A coupling 26, preferably ninety degrees, connects the other end of the conduit 24 with an inlet 28 of a diffuser 30, each in a sealed relationship. A drain valve 32, preferably movable between an opened and a closed position, is mounted in the lower portion 16 adjacent to the base 14. A contaminated water inlet port 34 is securely mounted in the lower portion 16 by suitable means, such as by welding. A contaminated water supply pipe (not shown) is connected to the contaminated water inlet port 34 in a sealed relationship. A flange 36 is secured to the upper end of the lower portion 16 by suitable means, such as by welding. The contaminated water inlet port 34 is located between the diffuser 30 and the flange 36. A plurality of circumferentially spaced apart openings 38 are formed in the flange 36 for purposes described below. Although not illustrated, the water inlet port and the diffuser could be located in the upper portion 20.

A flange 50 is secured to other lower end of the central portion 18 by suitable means, such as by welding. A plurality of circumferentially spaced apart openings 52 are formed therein and are located to be aligned with the openings 38 so that the flanges 36 and 50 may be joined together in a sealed relationship by sealing means (not shown) and using suitable means such as nuts and bolts (not shown). Another flange 54, FIG. 4, is secured to the upper end of the central portion 18 by suitable means, such as by welding. A plurality of circumferentially spaced apart openings 56 are formed in the another flange 54 for purposes described below.

A flange 60, FIG. 4 is secured to the lower end of the upper portion 20 by suitable means, such as by welding. A plurality of circumferentially spaced apart openings 62 are formed therein and are located to be aligned with the openings 56 so that the flanges 54 and 60 may be joined together in a sealed relationship by sealing means (not shown) and using suitable means such as nuts and bolts (not shown). Another flange 64 is secured to the upper end of the upper portion 20 by suitable means, such as by welding. A plurality of circumferentially spaced apart openings 66 are formed in the another flange 64 for purposes described below.

Figure 1:
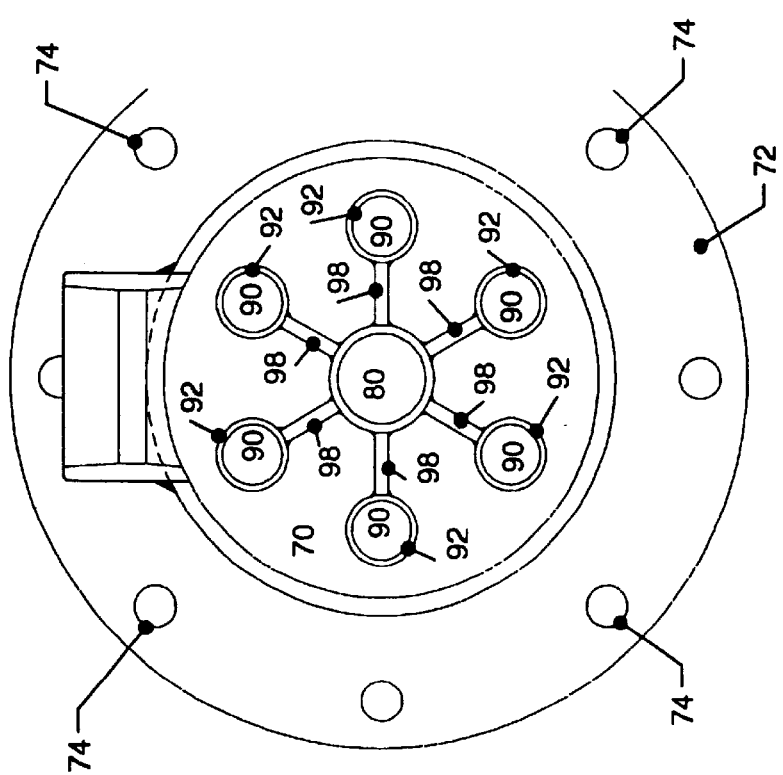
FIG. 1 is the bottom plan view of the cover plate of the apparatus.

A cover plate 70, FIGS. 1 and 4, fits into a recess formed in the another flange 64 and has a flange 72 integral therewith. A plurality of circumferentially spaced apart openings 74 are formed in the flange 72 and are located to be aligned with the openings 66 so that the flanges 64 and 72 may be joined together in a sealed relationship by sealing means (not shown) and using suitable means such as nuts and bolts (not shown).

Figure 2:
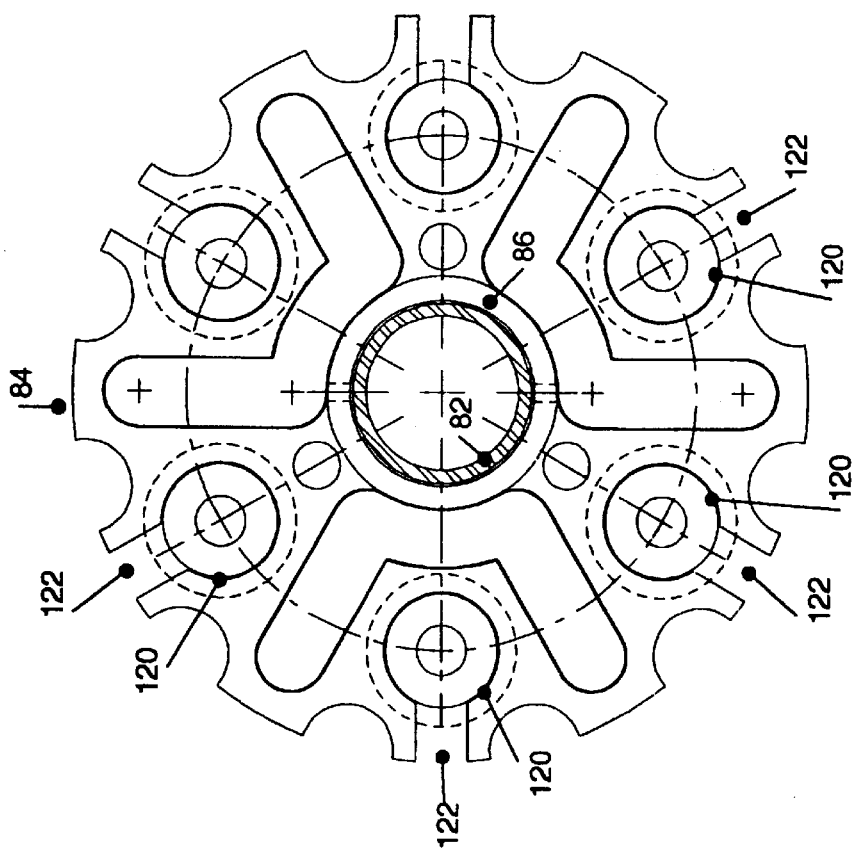
FIG. 2 is a top plan view of a position disk for the apparatus.

The cover plate 70 is provided with a central recess 80 into which one end of a support pipe 82 is inserted. The one end of the support pipe 82 is secured to the cover plate 70 by suitable means such as by welding. A lamp support 84, FIGS. 2 and 3, is secured to the other end of the support pipe 82 which other end passes through an opening in the lamp support 84. An annular flange 86 extends downwardly from the opening in the lamp support 84 and has a plurality of radially extending a circumferentially spaced apart openings 88 formed therein so that suitable means such as set screws (not shown) may be used to attach the lamp support 84 to the support pipe 82.

A plurality of circumferentially spaced apart openings 90 extend through the cover plate 70 for purposes described below. In the embodiment illustrated in the drawings, there are six openings 90. However, the number of openings 90 can vary depending on the operational characteristics of the apparatus 2. An annular recess 92 extends outwardly from a portion of each opening 90 and extends from the inner surface 94 of the cover plate 70. One end of a tube 96 is inserted into each opening 90 and each tube 96 is secured to the cover plate 70 by suitable means such as by welding. A plurality of radially extending arms 98 extend outwardly from the support pipe 82 and each arm 98 is secured to one of the tubes 96 adjacent to the other end portion 100 thereof. The other end portion 100 of each tube 96 is externally threaded for purposes described below.

An apparatus for mounting each of the ultra violet lamps 110, which in the embodiment illustrated in the drawings are six in number, is illustrated particularly in FIGS. 3 and 4. A sleeve type coupling 112 has an internally threaded opening 114 at one end thereof that is in threaded engagement with the externally threaded end portion 100. The other end of the sleeve type coupling 112 has a device 116, such as a rubber sleeve, for holding one end of a quartz tube 118. The lamp support 84 has a plurality of circumferentially spaced apart openings 120 formed therein with a radially extending slot 122 formed in the lamp support 84 and extending inwardly to each opening 120. A lock collar 124, FIG. 3, is mounted in each opening 120 and has a longitudinally extending portion that passes through the opening 120 and has a flange 126 that abuts against the lamp support 84. A lamp receiver 128, FIG. 3, has a generally cylindrical cavity 130 formed therein in which is mounted a similar device 116 for holding the other end of the quartz tube 118. The lamp receiver 128 has a longitudinally extending portion 132 that passes through a longitudinally extending opening in the lock collar 124 and has an externally threaded end portion 134. An internally threaded nut 136 is threaded onto the end portion 134 and bears against the flange 126 to hold the other end of the ultra violet lamp 110 on the lamp support 84.

The electrical connection for one of the six ultra violet lamps 110 is illustrated in FIG. 4. A cover 140 has a flange 142 having a plurality of circumferentially spaced apart openings that are aligned with threaded openings in the cover plate 70 so that threaded bolts (not shown) may be used to secure the cover 140 to the cover plate 70. The top portion 144 of the cover 140 is provided with a plurality of circumferentially spaced apart openings 146 which are aligned with the openings 90 in the cover plate 70 when the cover 140 is secured to the cover plate 70. An electrical conduit 148, one for each of the ultra violet lamps 110, is mounted by a coupling 150 in each of the openings 146. The electrical conduit 148 extends downwardly through a tube 96 and has an electrical connector 152 located at one end thereof. Suitable wires (not shown) from an electrical power source (not shown) pass through each electrical conduit 148 to supply electrical power to the electrical connector 152. Each ultra violet lamp 110 has an electrical connector 154 so that, when the electrical connectors 152 and 154 are joined together, electrical power is supplied to the ultra violet lamps 110. Suitable switches (not shown) control the supply of electrical power to the ultra violet lamps 110.

An outlet port 160 is mounted in the upper portion 20 by suitable means such as by welding. The treated water and gases flow through the outlet to suitable collection apparatus (not shown). If desired, another port (not shown) can be provided in the central portion 18. A measuring device could be connected to this another port for measuring characteristics of the treating operation or the another port could be used for any purpose.

In one embodiment of the invention, each of the portions 16, 18 and 20 comprises a plated or stainless steel pipe having an external diameter of about 8.0 inches. The lower portion 16 has a longitudinal extent of about 14 inches; the central portion 18 has a longitudinal extent of about 66 inches and the upper portion 20 has a longitudinal extent of about 48 inches. The inlet port 34 comprises a 3.0 inch NPT inlet port and the outlet 160 comprises a 3.0 inch NPT outlet port. Each of the tubes 96 has a longitudinal extent of about 48.0 inches. Each ultra violet lamp 110 has a longitudinal extent of about 62 inches and emits ultra violet light at a frequency of about 254 nanometers. It is understood that the foregoing dimensions are for illustration purposes only. In some instances it is desirable that the longitudinal extent of the upper portion 20 and the tubes 96 be of a different longitudinal extent for purposes described below. If this is so, the nuts and bolts holding the flanges 54 and 60 are loosened and a different upper portion 20 having the different tubes 96 and a support pipe 82 of a desired length secured thereto is connected to the central portion 18. The diffuser 30 has the capacity of emitting spherical particles of an average size of 1.0 millimeters at the rates of between about 0.25 and 2.5 cubic feet per minute.

The following example relates to the treatment of water contaminated with nitrates to remove the nitrates therefrom or to reduce the nitrate contamination to an acceptable level so that the contaminated water becomes potable. A sample of the nitrate contaminated water is analyzed to determine the character and the amount of the nitrates in the contaminated water. In one example the contaminated water contained nitrates in the amount of about 40 milligrams per million parts of the contaminated water. When such nitrate contaminated water is introduced through the inlet 34 at the rate of 70 gallons per minute, the ultra violet lamps 110 will act on the contaminated water to break down the nitrates in the contaminated water into ionized nitrogen and oxygen. In order to prevent the formed ionized nitrogen particles to reunite with other particles to reform into the undesirable nitrates, ionized nitrogen is emitted from the diffuser 30 at the rate of between about 0.25 to 2.5 cubic feet per minute. Since the ionized nitrogen particles from the diffuser 30 are mixed with the incoming nitrate contaminated water flowing through the inlet port 34, the ionized nitrogen particles from the diffuser are immediately available to unite with the ionized nitrogen particles freed by the ultra violet lamps 110. The mixture in the central portion 18 then flows into the upper portion 20. During the passage through the upper portion 20, the ionized nitrogen particles combine to form nitrogen and oxygen gases. The treated water, the nitrogen gas and the oxygen gas exit the upper portion 20 through the outlet port 160. The treated water has a nitrate content less than 5.0 milligrams per million parts of the treated water. Thereafter, the nitrogen gas and the oxygen gases are vented to the atmosphere, using conventional apparatus and the treated water is directed to conventional collection apparatus (not shown).

The above-described apparatus may be used to treat other types of contaminated water wherein the particles associated with the contaminated water and the ionized particles will be of a different chemical character.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

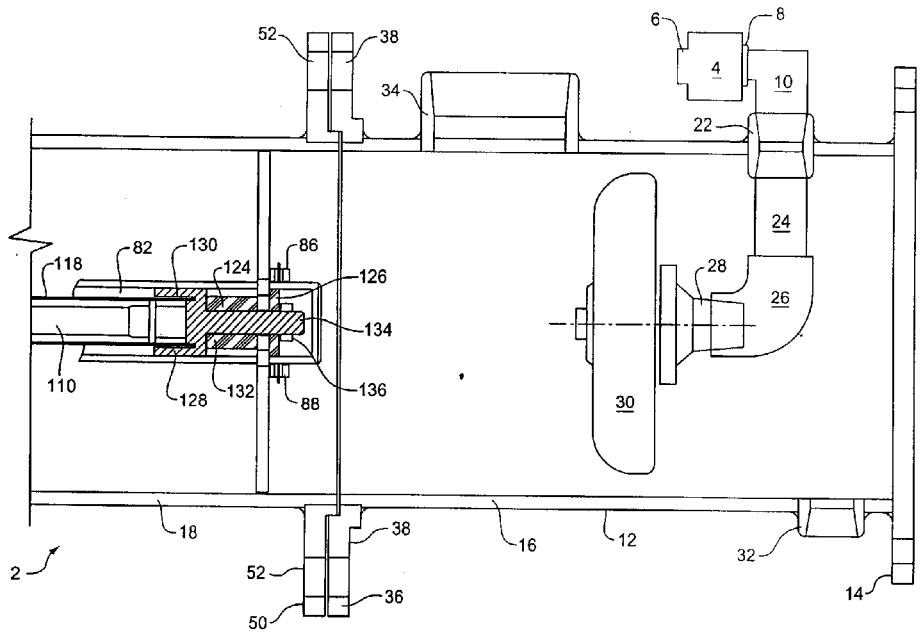

What is claimed is:

1. Apparatus for treating a nitrate contaminated liquid comprising:

a closed hollow housing;

said closed hollow housing having at least an inlet portion for receiving said nitrate contaminated liquid and an outlet portion for removing treated liquid;

apparatus located in said inlet portion for supplying a flow of ionized nitrogen in said closed hollow housing;

an inlet port in said closed hollow housing connected to a supply of said nitrate contaminated liquid so that said nitrate contaminated liquid enters into and flows through said closed hollow housing;

said inlet port and said apparatus for supplying said ionized nitrogen being located so that said ionized nitrogen is entrained in said nitrate contaminated liquid in said closed hollow housing;

treating apparatus in said closed hollow housing for changing said nitrates in said nitrate contaminated liquid into at least freed ionized nitrogen;

said treating apparatus being located in said closed hollow housing so that said nitrate contaminated liquid with said ionized nitrogen entrained therein is exposed to said treating apparatus so that as it is being treated said freed ionized nitrogen and said ionized nitrogen combine to form nitrogen gas; and an outlet port connected to at least one collection apparatus so that the treated liquid may be removed from said closed hollow housing.

2. Apparatus as in claim 1 wherein said treating apparatus comprises:

at least one ultra violet lamp emitting light in the frequency range of between about 185 and 254 nanometers.

3. Apparatus as in claim 2 wherein said apparatus comprises:

a diffuser;

a unit for converting atmospheric nitrogen into ionized nitrogen; and at least one conduit extending between said unit and said diffuser for conveying said ionized nitrogen from said unit to said diffuser.

4. Apparatus as in claim 1 wherein said treating apparatus comprises:

a plurality of spaced apart ultra violet lamps each emitting light in the frequency range of between about 185 and 254 nanometers.

5. Apparatus as in claim 4 wherein said apparatus comprises:

a diffuser;

a unit for converting atmospheric nitrogen into ionized nitrogen; and at least one conduit extending between said unit and said diffuser for conveying said ionized nitrogen from said unit to said diffuser.

6. A method for treating a nitrate contaminated liquid using a closed hollow housing having at least an inlet portion, a treating portion and an exit portion comprising:

flowing a continuous stream of a nitrate contaminated liquid into said inlet portion;

flowing a continuous supply of ionized nitrogen in said closed hollow housing;

entraining said continuous supply of ionized nitrogen into said continuous stream of a nitrate contaminated liquid;

locating treating apparatus in said treating portion to change said nitrates in said nitrate contaminated liquid into at least freed ionized nitrogen;

treating said continuous stream of a nitrate contaminated liquid having said ionized nitrogen entrained therein by exposing said continuous stream of a nitrate contaminated liquid having said ionized nitrogen entrained therein to said treating apparatus so that as said ionized nitrogen is freed from said nitrate contaminated liquid and said freed ionized nitrogen combines with said ionized nitrogen to form at least a nitrogen gas and a treated liquid; and collecting said treated liquid.

7. A method as in claim 6 and further comprising:

mounting at least one ultra violet lamp emitting light in the frequency range of between about 185 and 254 nanometers in said closed hollow housing; and passing said continuous stream of nitrate contaminated liquid through said closed hollow housing to be exposed to said light.

8. A method as in claim 7 and further comprising:

mounting a diffuser in said closed hollow housing for supplying said continuous supply of ionized nitrogen;

mounting a unit for converting atmospheric nitrogen into ionized nitrogen adjacent to said closed hollow housing; and conveying a continuous supply of ionized nitrogen from said unit to said diffuser.

9. A method as in claim 6 and further comprising:

mounting a plurality of spaced apart ultra violet lamps each emitting light in the frequency range of between about 185 and 254 nanometers in said closed hollow housing; and passing said continuous stream of nitrate contaminated liquid through said closed hollow housing to be exposed to said light.

10. A method as in claim 9 and further comprising:

mounting a diffuser in said closed hollow housing for supplying said continuous supply of ionized nitrogen;

mounting a unit for converting atmospheric nitrogen into ionized nitrogen adjacent to said closed hollow housing; and conveying a continuous supply of ionized nitrogen from said unit to said diffuser.

* * * * *

UNITED STATES PATENT AND TRADEMARK OFFICE
CERTIFICATE OF CORRECTION

PATENT NO.     : 6,251,287 B1
DATED          : June 26, 2001
INVENTOR(S)    : Fields et al.

It is certified that error appears in the above-identified patent and that said Letters Patent is hereby corrected as shown below:

<u>Title page,</u>
Showing the illustrative figure, should be deleted and substitute therefor the attached title page.

<u>Drawings,</u>
Delete Figures 3 & 4, and substitute therefor with drawing Figures 3 & 4 as shown on the attached page.

Signed and Sealed this

Eleventh Day of June, 2002

*Attest:*

*Attesting Officer*

JAMES E. ROGAN
*Director of the United States Patent and Trademark Office*

(12) United States Patent
Fields et al.

(10) Patent No.: US 6,251,287 B1
(45) Date of Patent: Jun. 26, 2001

(54) APPARATUS AND METHOD FOR TREATING LIQUIDS

(75) Inventors: William M. Fields, Evergreen; Donald L. Boyd, Arvada, both of CO (US)

(73) Assignee: Water Systems Integrators, LLC, Englewood, CO (US)

(*) Notice: Subject to any disclaimer, the term of this patent is extended or adjusted under 35 U.S.C. 154(b) by 0 days.

(21) Appl. No.: 09/552,639

(22) Filed: Apr. 19, 2000

Related U.S. Application Data

(60) Provisional application No. 60/129,997, filed on Apr. 19, 1999.

(51) Int. Cl.[7] ............................................. C02F 1/32
(52) U.S. Cl. .................. 210/748; 210/750; 210/188; 210/192; 210/198.1; 210/205; 210/218; 210/903; 422/24; 422/186.3
(58) Field of Search ............................. 210/748, 750, 210/188, 192, 198.1, 205, 218, 903; 422/24, 186.3

(56) References Cited

U.S. PATENT DOCUMENTS

| | | |
|---|---|---|
| 3,862,296 * | 1/1975 | Dotson et al. . |
| 4,995,955 | 2/1991 | Kim et al. .................... 204/157.3 |
| 5,238,581 | 8/1993 | Frame et al. .................. 210/748 |
| 5,660,719 | 8/1997 | Kurtz et al. ................... 210/85 |
| 5,871,620 * | 2/1999 | Haug et al. . |

* cited by examiner

*Primary Examiner*—David A. Simmons
*Assistant Examiner*—Betsey Morrison Hoey
(74) *Attorney, Agent, or Firm*—Duft, Graziano & Forest, P.C.

(57) ABSTRACT

A system for treating a nitrate contaminated liquid to remove deleterious or undesirable nitrates therefrom wherein a supply of ionized nitrogen is entrained into a continuous stream of a nitrate contaminated liquid and thereafter is exposed to treating apparatus which changes the nitrates in the nitrate contaminated liquid into at least ionized nitrogen which then combines with the ionized nitrogen entrained in the continuous stream of a nitrate contaminated liquid to form a separated nitrogen gas and a treated liquid.

10 Claims, 2 Drawing Sheets